United States Patent
Lai et al.

(10) Patent No.: US 11,200,184 B1
(45) Date of Patent: Dec. 14, 2021

(54) INTERRUPT CONTROL DEVICE AND INTERRUPT CONTROL METHOD BETWEEN CLOCK DOMAINS

(71) Applicant: INDUSTRIAL TECHNOLOGY RESEARCH INSTITUTE, Hsinchu (TW)

(72) Inventors: Jenn-Shiang Lai, Zhunan Township (TW); Ting-Sheng Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/131,140

(22) Filed: Dec. 22, 2020

(51) Int. Cl.
*G06F 13/24* (2006.01)
*G06F 1/12* (2006.01)
*G06F 1/08* (2006.01)

(52) U.S. Cl.
CPC .............. *G06F 13/24* (2013.01); *G06F 1/08* (2013.01); *G06F 1/12* (2013.01); *G06F 2213/2422* (2013.01)

(58) Field of Classification Search
CPC ..... G06F 13/24; G06F 1/12; G06F 2213/2422
See application file for complete search history.

(56) References Cited

U.S. PATENT DOCUMENTS

| | | | |
|---|---|---|---|
| 5,367,689 A | * | 11/1994 | Mayer ............... G06F 13/24 710/260 |
| 5,819,096 A | * | 10/1998 | Nelson ............... G06F 13/24 710/260 |
| 6,247,084 B1 | | 6/2001 | Apostol, Jr. et al. |
| 6,970,966 B2 | | 11/2005 | Gemelli et al. |
| 7,113,122 B2 | | 9/2006 | Gangstoe et al. |
| 7,128,270 B2 | | 10/2006 | Silverbrook et al. |

(Continued)

FOREIGN PATENT DOCUMENTS

| CN | 101236541 A | 8/2008 |
|---|---|---|
| TW | I395089 B1 | 5/2013 |

OTHER PUBLICATIONS

Al et al., "Enhanced Sampling Clock Offset Correction Based on Time Domain Estimation Scheme," IEEE Transactions on Consumer Electronics, vol. 57, No. 2, May 2011, pp. 696-704.

(Continued)

*Primary Examiner* — Zachary K Huson
(74) *Attorney, Agent, or Firm* — Birch, Stewart, Kolasch & Birch, LLP

(57) ABSTRACT

An interrupt control device between clock domains is provided. An interrupt sharing logic is configured to receive one or more original interrupt signals and generate a combined interrupt signal. An interrupt processing logic is configured to output a processed interrupt signal to a processor according to the combined interrupt signal, so that the processor executes an interrupt service routine. When the interrupt service routine is executed, the processed interrupt signal changes to be disabled; before the interrupt service routine is completed, the processor outputs an interrupt clear signal to change the respective interrupt signal to be negated. After the interrupt processing logic detects that interrupt signal has been cleared successfully, the interrupt processing logic will generate the processed interrupt signal according to the combined interrupt signal again.

18 Claims, 15 Drawing Sheets

(56) References Cited

U.S. PATENT DOCUMENTS

| | | | |
|---|---|---|---|
| 7,130,942 | B2 | 10/2006 | Gemelli et al. |
| 7,292,174 | B2 | 11/2007 | Gangstoe et al. |
| 7,562,244 | B2 | 7/2009 | Wielage |
| 7,567,279 | B2 | 7/2009 | Yourlo et al. |
| 7,802,075 | B2 | 9/2010 | Bourdon et al. |
| 7,990,450 | B2 | 8/2011 | Silverbrook et al. |
| 8,023,020 | B2 | 9/2011 | Moini et al. |
| 8,352,695 | B2 | 1/2013 | Klein et al. |
| 8,407,528 | B2 | 3/2013 | Larson |
| 8,416,468 | B2 | 4/2013 | Underwood et al. |
| 8,659,336 | B2 | 2/2014 | Kulmala et al. |
| 8,935,302 | B2 | 1/2015 | Flynn et al. |
| 9,432,298 | B1 | 8/2016 | Smith |
| 10,515,046 | B2 | 12/2019 | Fleming et al. |
| 10,558,371 | B2 | 2/2020 | Flynn et al. |
| 10,788,853 | B2 * | 9/2020 | Soni ................. G06F 13/24 |
| 2002/0078287 | A1 * | 6/2002 | Shinagawa ......... G06F 13/24 710/268 |
| 2013/0013950 | A1 | 1/2013 | Maddigan et al. |
| 2016/0253277 | A1 * | 9/2016 | Tsirkin ............. G06F 13/4022 710/313 |
| 2016/0350162 | A1 * | 12/2016 | Schlagenhaft ...... G06F 11/0721 |
| 2018/0217630 | A1 | 8/2018 | Soni et al. |
| 2019/0303328 | A1 | 10/2019 | Balski et al. |

OTHER PUBLICATIONS

Elkholy et al., "Design and Analysis of Low-Power High-Frequency Robust Sub-Harmonic Injection-Locked Clock Multipliers," IEEE Journal of Solid-State Circuits, vol. 50, No. 12, Dec. 2015, pp. 3160-3174.

Ge et al., "Analysis and Verification of Jitter in Bang-Bang Clock and Data Recovery Circuit With a Second-Order Loop Filter," IEEE Transactions on Very Large Scale Integration (VLSI) Systems, vol. 27, No. 10, Oct. 2019, pp. 2223-2236.

Guan et al., "High Time-Resolution 640-Gb/s Clock Recovery Using Time-Domain Optical Fourier Transformation and Narrowband Optical Filter," IEEE Photonics Technology Letters, vol. 22, No. 23, Dec. 1, 2010, pp. 1735-1737.

Karimi et al., "Detection, Diagnosis, and Recovery From Clock-Domain Crossing Failures in Multiclock SoCs," IEEE Transactions on Computer-Aided Design of Integrated Circuits and Systems, vol. 32, No. 9, Sep. 2013, pp. 1395-1408.

Lei et al., "Time-Domain Evaluation Method for Clock Frequency Stability Based on Precise Point Positioning," IEEE Access, Sep. 25, 2019, p. 132413-132422.

Najafi et al., "Polysynchronous Clocking: Exploiting the Skew Tolerance of Stochastic Circuits," IEEE Transactions on Computers, vol. 66, No. 10, Oct. 2017, pp. 1734-1746.

* cited by examiner

INTERRUPT CONTROL DEVICE AND INTERRUPT CONTROL METHOD BETWEEN CLOCK DOMAINS

TECHNICAL FIELD

The disclosure relates in general to an interrupt control device and an interrupt control method between clock domains.

BACKGROUND

In chip design, signal transmission between circuits at different clock domains is needed. If the signal transmission between circuits at different clock domains is not handled well, metastable state may occur in the transmitted signals. When the signal is unstable, the chip will operate under uncertain conditions, chip failure may occur and the reliability of the chip will be reduced. Normally, the above metastable state cannot be found by using software simulation beforehand and has become a big challenge in debugging of circuit design.

The above problem generated in clock domain crossing (CDC) is likely to occur particularly in the situation when several signal sources in the first clock domain concurrently transmit signals to the circuits in the second clock domain, for example, in the situation that several peripheral devices in the first clock domain concurrently transmit interrupt signals to the processor in the second clock domain. Although there are many solutions available to resolve the above problem, most of them only synchronize the interrupt signals in the first clock domain by using signal synchronizer(s) and then transmit the synchronized signals to the second clock domain. Since these solutions do not examine the event corresponding to the clearance of the respective interrupt in the second clock domain, the circuit may generate an incorrect operation.

Therefore, it has become a prominent task for the industries to resolve the issue of incorrect operation caused by clock domain crossing.

SUMMARY

According to one embodiment, an interrupt control device between clock domains is provided. The interrupt control device between clock domains includes an interrupt sharing logic and an interrupt processing logic. The interrupt sharing logic is configured to receive one or more original interrupt signals and generate a combined interrupt signal. The interrupt processing logic is configured to output a processed interrupt signal to a processor according to the combined interrupt signal, so that the processor correspondingly executes an interrupt service routine. When the interrupt service routine is executed, the processor sends a control signal to block further interrupt(s). Before the interrupt service routine is completed, the processor outputs an interrupt clear signal to change a respective interrupt signal to be negated among the one or more original interrupt signals, and after the interrupt processing logic detects the clearance of the respective interrupt signal, the interrupt processing logic generate the processed interrupt signal according to the combined interrupt signal again. The original interrupt signals are generated by peripheral devices in a first clock domain. The processor is located in a second clock domain, the interrupt sharing logic is located in the first clock domain, and the interrupt processing logic is located in both of the first and second clock domains.

According to another embodiment, an interrupt control method between clock domains is provided. The method includes following steps. One or more original interrupt signals are combined as a combined interrupt signal. A processed interrupt signal is generated according to the combined interrupt signal, so that a processor executes an interrupt service routine. When the interrupt service routine is executed, the processed interrupt signal changes to be disabled. Before the interrupt service routine is completed, the processor outputs an interrupt clear signal to instruct changing a respective interrupt signal to be negated among the original interrupt signals. After the clearance of the respective interrupt signal is detected, the processed interrupt signal is generated according to the combined interrupt signal again. The original interrupt signals are generated by peripheral devices in a first clock domain, the processor is located in a second clock domain, the combined interrupt signal is located in the first clock domain, and the processed interrupt signal is located in the second clock domain.

The above and other aspects of the invention will become better understood with regard to the following detailed description of the preferred but non-limiting embodiment(s). The following description is made with reference to the accompanying drawings.

Figure 1:
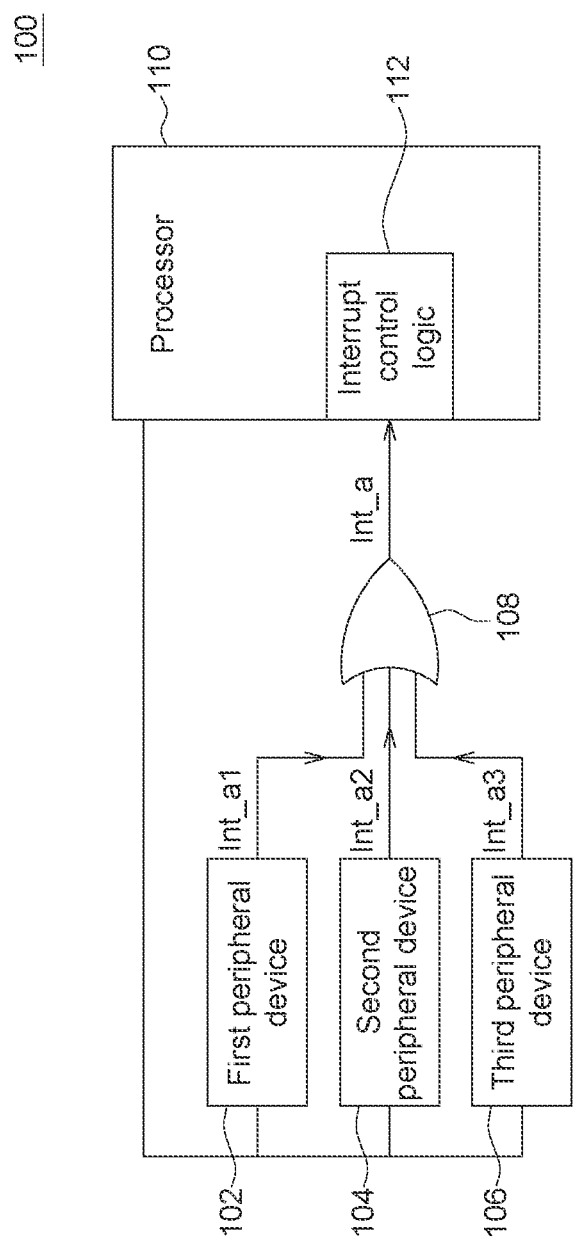
FIG. 1 is an example diagram of an interrupt signal processing system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Interrupt request (IRQ) refers to an interrupt signal transmitted to a processor from a hardware device in a computer. The interrupt signal requests the processor to temporarily stop current operation and then run related operations for the device from which the interrupt signal is transmitted.

Referring to FIG. 1, an example diagram of an interrupt signal processing system 100 is shown. The interrupt signal processing system 100 includes a first peripheral device 102, a second peripheral device 104, a third peripheral device 106, an OR gate 108, a processor 110, and an interrupt control logic 112. The first peripheral device 102, the second peripheral device 104, the third peripheral device 106 respectively generate a first original interrupt signal Int_a1, a second original interrupt signal Int_a2, and a third original interrupt signal Int_a3. The OR gate 108 performs logic OR operation to the first original interrupt signal Int_a1, the second original interrupt signal Int_a2, and the third original interrupt signal Int_a3 to obtain a combined interrupt signal Int_a. The combined interrupt signal Int_a is inputted to the interrupt control logic 112, and the processor 110 correspondingly executes an interrupt service routine.

Figure 2:
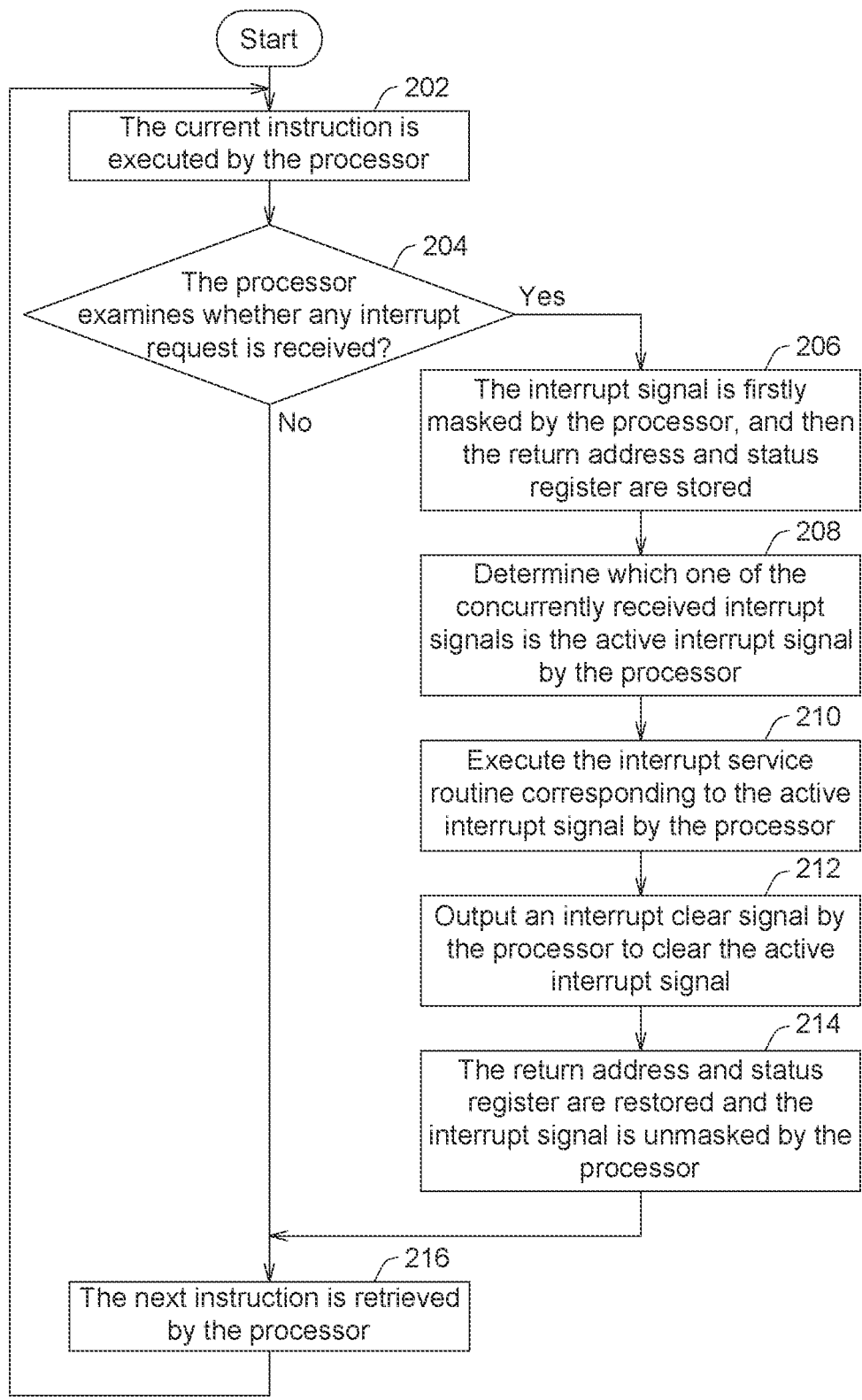
FIG. 2 is a flowchart of relevant operations performed by a processor in response to an interrupt signal.
Figure 3:
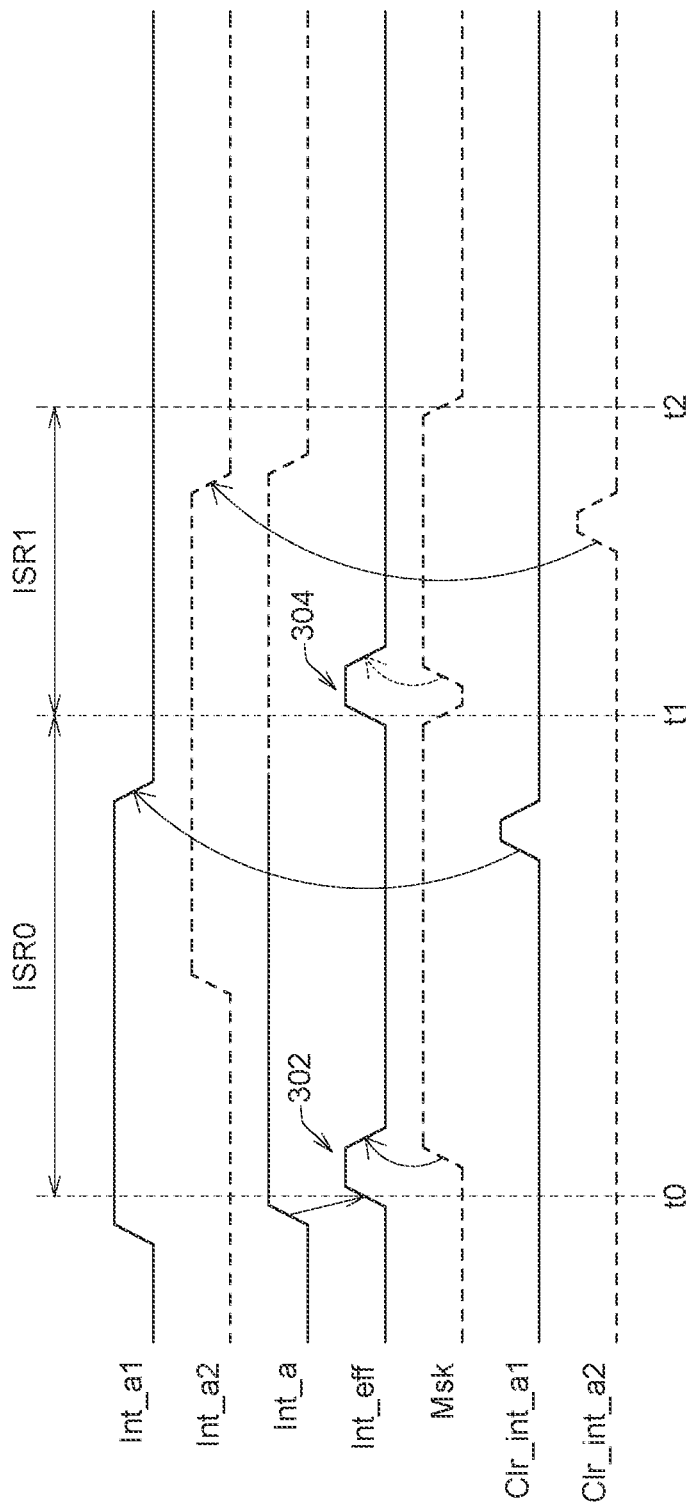
FIG. 3 is a waveform diagram of relevant signals generated when relevant operations are performed by the processor in response to an interrupt signal.

Referring to FIG. 2, a flowchart of relevant operations performed by a processor in response to an interrupt signal is shown. Refer to both FIG. 1 and FIG. 3. FIG. 3 is a waveform diagram of relevant signals generated when relevant operations are performed by the processor in response to an interrupt signal. FIG. 3 only illustrates the first original interrupt signal Int_a1 and the second original interrupt signal Int_a2. Firstly, the method begins at step 202, and the current instruction is executed by the processor 110. Then, the method proceeds to step 204, the processor 110 examines whether any interrupt request is received. If yes, the method proceeds to step 206, otherwise the method proceeds to step 216. For example, the OR gate 108 firstly performs logic OR operation on the first original interrupt signal Int_a1 and the second original interrupt signal Int_a2 to obtain a combined interrupt signal Int_a. The interrupt control logic 112 receives the combined interrupt signal Int_a and outputs an effective interrupt signal Int_eff to the processor 110. When the combined interrupt signal Int_a changes to be asserted (such as high level), the interrupt control logic 112 correspondingly changes the effective interrupt signal Int_eff to be asserted (such as high level) at time point t0. The processor 110 knows that the upcoming instruction is going to be interrupted according to the assertion of the effective interrupt signal Int_eff.

In step 206, the interrupt signal is firstly masked by the processor 110, and then the return address and status register are stored. For example, after the effective active signal Int_eff is enabled, the processor 110 changes the mask signal Msk to be enabled (such as high level), so that the interrupt control logic 112 accordingly changes the effective active signal Int_eff to be negated (such as low level).

Then, the method proceeds to step 208, which one of the concurrently received interrupt signals is the active interrupt signal is determined by the processor 110 when several interrupt signals are received at the same time. For example, the processor 110 uses the interrupt signal outputted from a peripheral device with a higher priority as the active interrupt signal. For example, when the first peripheral device 102 has a higher priority, then the processor 110 uses the first original interrupt signal Int_a1 outputted from the first peripheral device 102 as the active interrupt signal, wherein the first original interrupt signal Int_a1 has been included in the combined interrupt signal Int_a through the logic OR operation.

Then, the method proceeds to step 210, the interrupt service routine corresponding to the active interrupt signal is executed by the processor 110. For example, the corresponding interrupt service routine of the interrupt request (such as the interrupt request of the first peripheral device 102) corresponding to the pulse 302 of the effective active signal Int_eff is executed. The interrupt service routine is executed during period ISR0. Then, the method proceeds to step 212, before the interrupt service routine is completed, an interrupt clear signal is outputted to the peripheral device corresponding to the active interrupt signal by the processor 110 to clear the active interrupt signal. For example, the processor 110 outputs the interrupt clear signal Clr_int_a1 to the first peripheral device 102 corresponding to the active interrupt signal, so that the first peripheral device 102 negates the first original interrupt signal Int_a1 (such as low level).

Then, the method proceeds to step 214, the return address and status register are restored and the interrupt signal is unmasked by the processor 110. For example, the processor 110 changes the mask signal Msk to be disabled at time point t1. Then, the method proceeds to step 216, the next instruction is retrieved by the processor 110, and the method returns to step 202 and steps 204 to 216. For example, after the mask signal Msk changes to be disabled, the interrupt control logic 112 check the state of the combined interrupt signal Int_a again. When the combined interrupt signal Int_a is still asserted (such as high level) because of the second original interrupt signal int_a2, the interrupt control logic 112 correspondingly asserts the effective interrupt signal Int_eff (such as high level) at time point t1. So, the processor 110 knows that there is another interrupt request.

After that, after the assertion of the effective signal Int_eff, the processor 110 changes the mask signal Msk to be enabled (such as high level) to mask the interrupt signal. Meanwhile, the interrupt control logic 112 negates the effective active signal Int_eff (such as low level). Then, the processor 110 executes the corresponding interrupt service routine of the interrupt request corresponding to the pulse 304 of the effective signal Int_eff (the interrupt request corresponding to the second original interrupt signal Int_a2 of the second peripheral device 104). The interrupt service routine is executed during period ISR1. Then, before the interrupt service routine is completed, the processor 110 outputs the interrupt clear signal Clr_int_a2 to the second peripheral device 104, so that the second peripheral device 104 changes the outputted second original interrupt signal Int_a2 to be negated (such as low level).

Figure 4A:
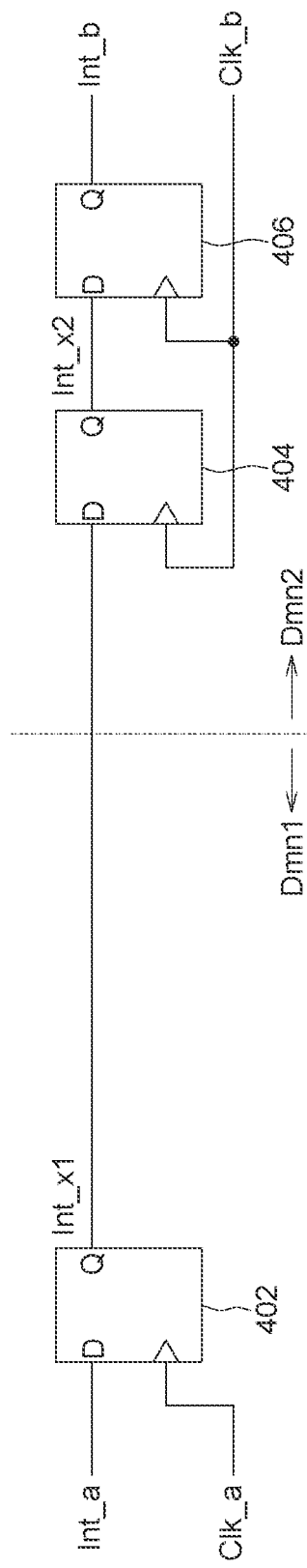
FIG. 4A is a circuit diagram of interrupt signal transmission between clock domains.
Figure 4B:
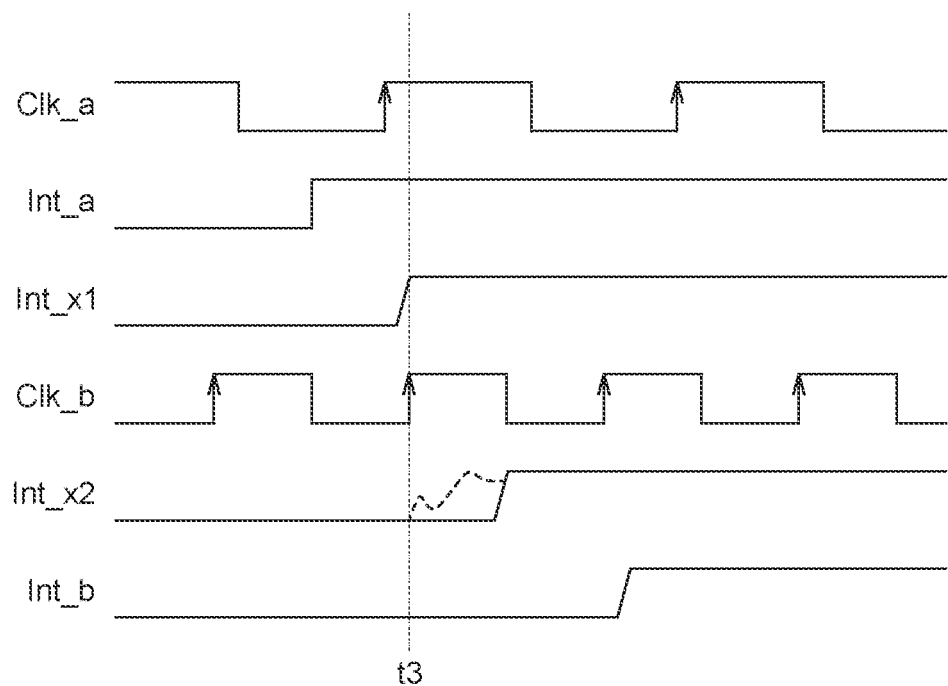
FIG. 4B is a waveform diagram of relevant signals of the circuit of FIG. 4A.

Refer to both FIG. 4A and FIG. 4B. FIG. 4A is a circuit diagram of interrupt signal transmission between clock domains. FIG. 4B is a waveform diagram of relevant signals of the circuit of FIG. 4A. Suppose the combined interrupt signal Int_a is transmitted to the second clock domain Dmn2 from the first clock domain Dmn1. The flip-flop (such as D flip-flop) 402 in the first clock domain Dmn1 is triggered by a triggering edge (a rising edge in this example) of the first clock Clk_a. The flip-flop 404 and the flip-flop 406 in the second clock domain Dmn2 are triggered by a triggering edge (also a rising edge in this example) of the second clock Clk_b. The combined interrupt signal Int_a is firstly inputted to the flip-flop 402 in the first clock domain Dmn1 to obtain an intermediary interrupt signal Int_x1. Then, the intermediary interrupt signal Int_x1 is transmitted to the flip-flop 404 in the second clock domain Dmn2 to obtain an intermediary interrupt signal Int_x2. Take the flip-flop 402 and the flip-flop 404 which are triggered by a rising edge of a clock signal for example. At time point t3, since the rising edge of the intermediary interrupt signal Int_x1 may not have sufficient setup time or hold time with respect to the rising edge of the second clock Clk_b, the intermediary interrupt signal Int_x2 outputted by the flip-flop 404 may generate an uncertain state or may be unstable, that is, the intermediary interrupt signal Int_x2 may be metastable. After the metastable intermediary interrupt signal Int_x2 is inputted to the flip-flop 406, a more stable processed interrupt signal Int_b will be obtained. The setup time refers to the time for which the signal inputted to the data input of the flip-flop should remain constant before the triggering edge of the clock signal occurs. The hold time refers to the time for which the signal inputted to the data input of the flip-flop should remain constant after the triggering edge of the clock signal occurs.

Figure 5:
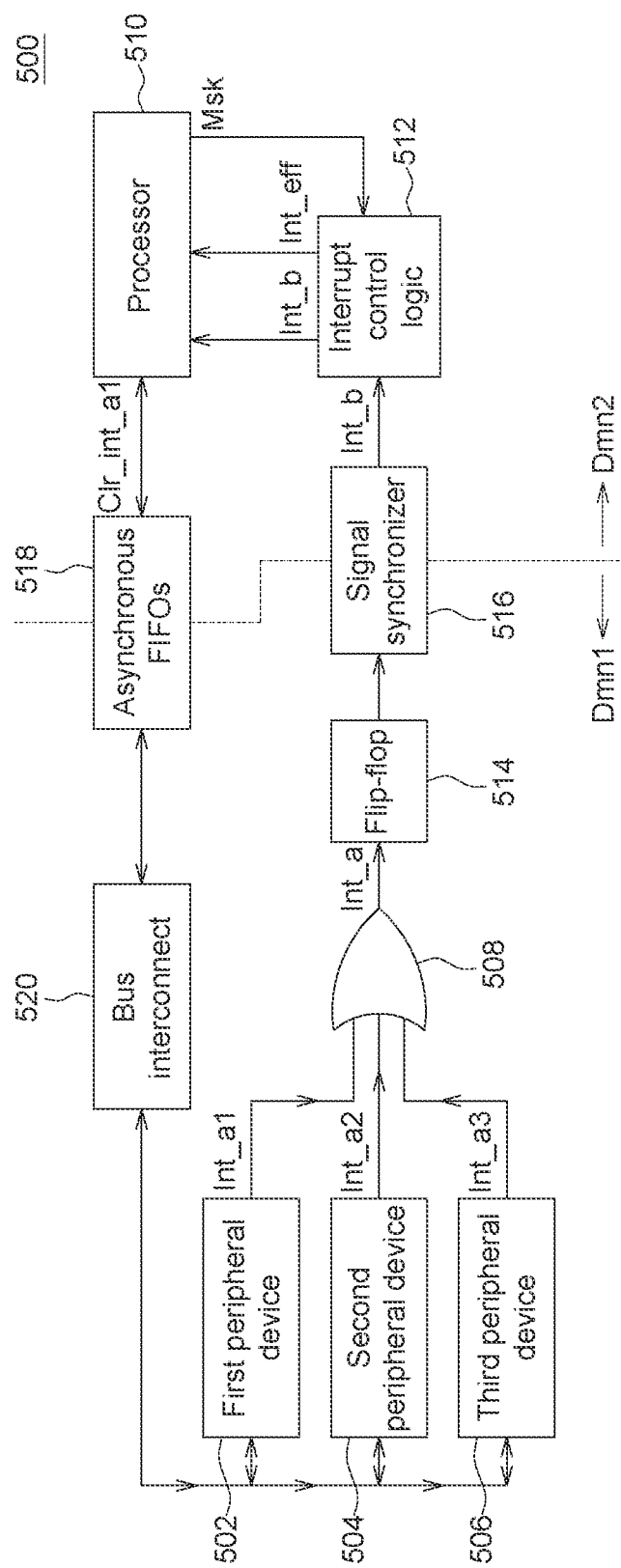
FIG. 5 is a block diagram of an interrupt signal processing system using a signal synchronizer.

The above metastable state can be resolved through the use of a signal synchronizer. Referring to FIG. 5, a block diagram of an interrupt signal processing system using a signal synchronizer is shown. In the interrupt signal processing system 500, a first original interrupt signal Int_a1, a second original interrupt signal Int_a2, and a third original interrupt signal Int_a3, respectively outputted from the first peripheral device 502, the second peripheral device 504, and the third peripheral device 506, are inputted to an OR gate 508 to generate a combined interrupt signal Int_a. The combined interrupt signal Int_a is inputted to the flip-flop 514 and then the signal synchronizer 516 to generate a processed interrupt signal Int_b. The processed interrupt signal Int_b is inputted to the interrupt control logic 512 for the processor 510 to execute a corresponding interrupt service routine. The processor 510 will send instruction(s) and will receive response(s) by way of the asynchronous FIFOs 518 and the bus interconnect 520 to and from the first peripheral device 502, the second peripheral device 504, or the third peripheral device 506.

Although the interrupt signal processing system 500 of FIG. 5 synchronizes the combined interrupt signal Int_a in the first clock domain Dmn1 by using a signal synchronizer 516 and then transmits the synchronized signal to the second clock domain Dmn2, the interrupt signal processing system 500 does not perform synchronization in the second clock domain Dmn2 for the clear operation corresponding to the interrupt signal in the first clock domain Dmn1 This may cause the processor 510 to generate an incorrect operation.

Figure 6:
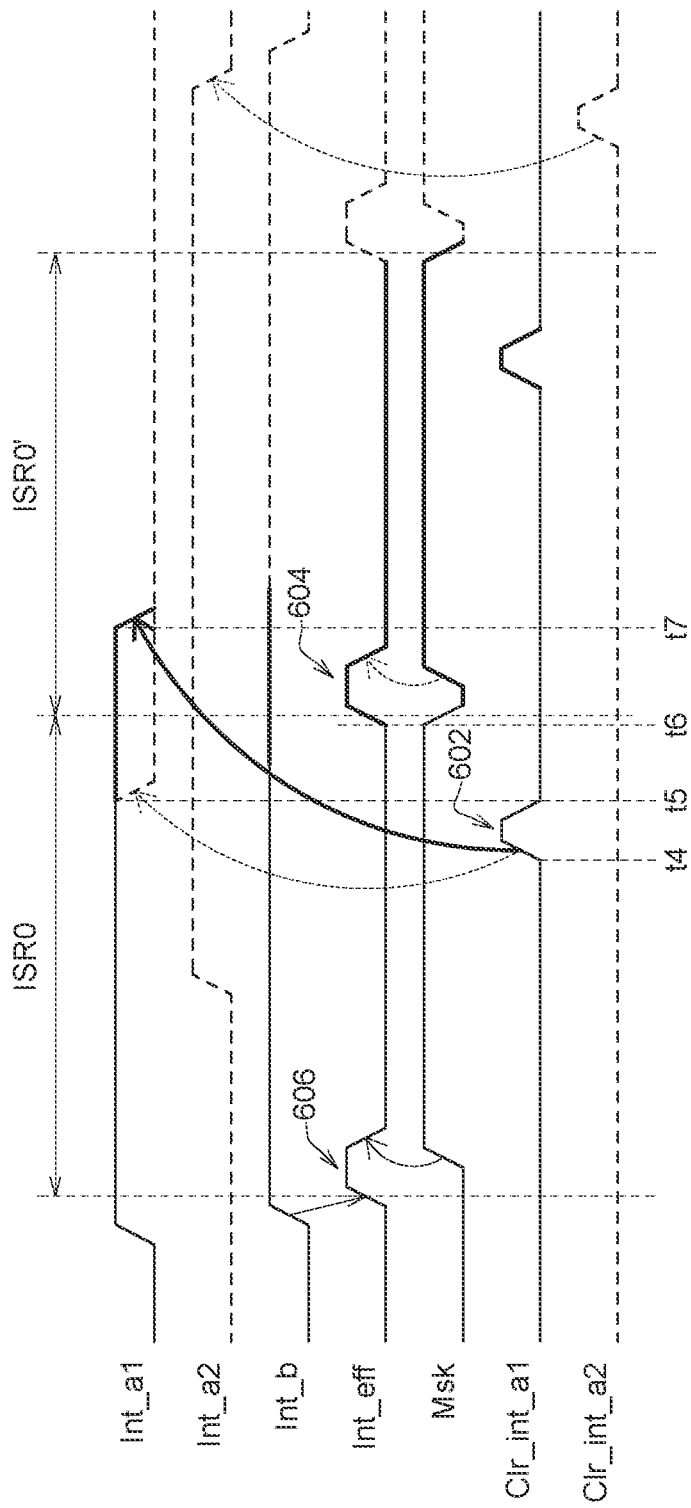
FIG. 6 is a waveform diagram of relevant signals generated when the interrupt signal processing system of FIG. 5 generates an incorrect operation.

Referring to FIG. 6, a waveform diagram of relevant signals generated when the interrupt signal processing system of FIG. 5 generates an incorrect operation is shown. Since the interrupt clear signal Clr_int_a1 outputted from the processor 510 is transmitted to the first peripheral device 502 via the asynchronous FIFOs 518 and the bus interconnect 520, the time point at which the pulse 602 of the interrupt clear signal Clr_int_a1 is outputted from the processor 510 will be different from the time point at which the pulse 602 actually received by the first peripheral device 502. For example, when the processor 510 outputs the pulse 602 at time point t4, the processor 510 would think that the first peripheral device 502 should have received the pulse 602 at time point t5 (that is, the time point at which the pulse 602 finishes), and the processor 510 would assume that the first original interrupt signal Int_a1 had been served completely (such as low level as indicated by the dotted part of the original interrupt signal Int_a1). However, since signal transmission between different clock domains may contain multiple bus hierarchies (which is represented by the bus interconnect 520, for example), the required transmission time will be longer than what the processor 510 estimates. Therefore, the first peripheral device 502 may not receive the pulse 602 of the interrupt clear signal Clr_int_a1 until time point t7 and may accordingly negate the first original interrupt signal Int_a1 (such as low level) at time point t7. However, since the processor 510 mistakes that the first peripheral device 502 should have already received the pulse 602 of the interrupt clear signal Clr_int_a1 at time point t5, the processor 510 changes the mask signal Msk to be disabled (such as low level) at time point t6 and sample the processed interrupt signal Int_b (that is the result of the logic OR operation of the first original interrupt signal Int_a1 and the second original interrupt signal Int_a2) accordingly to obtain a pulse 604 of the effective interrupt signal Int_eff. Since Int_a1 has a higher priority, therefore even though the first original interrupt signal Int_a1 has already been serviced during interval ISR0 with respect to the previous pulse 606 of the effective interrupt signal Int_eff, the processor 510 will again execute the interrupt service routine corresponding to the first original interrupt signal Int_a1 with respective to the pulse 604 of the effective interrupt signal Int_eff during interval ISR0', which causes the processor 510 to generate an incorrect operation. Relevant part of the waveform corresponding to incorrect operation is represented by bold lines.

Figure 7:
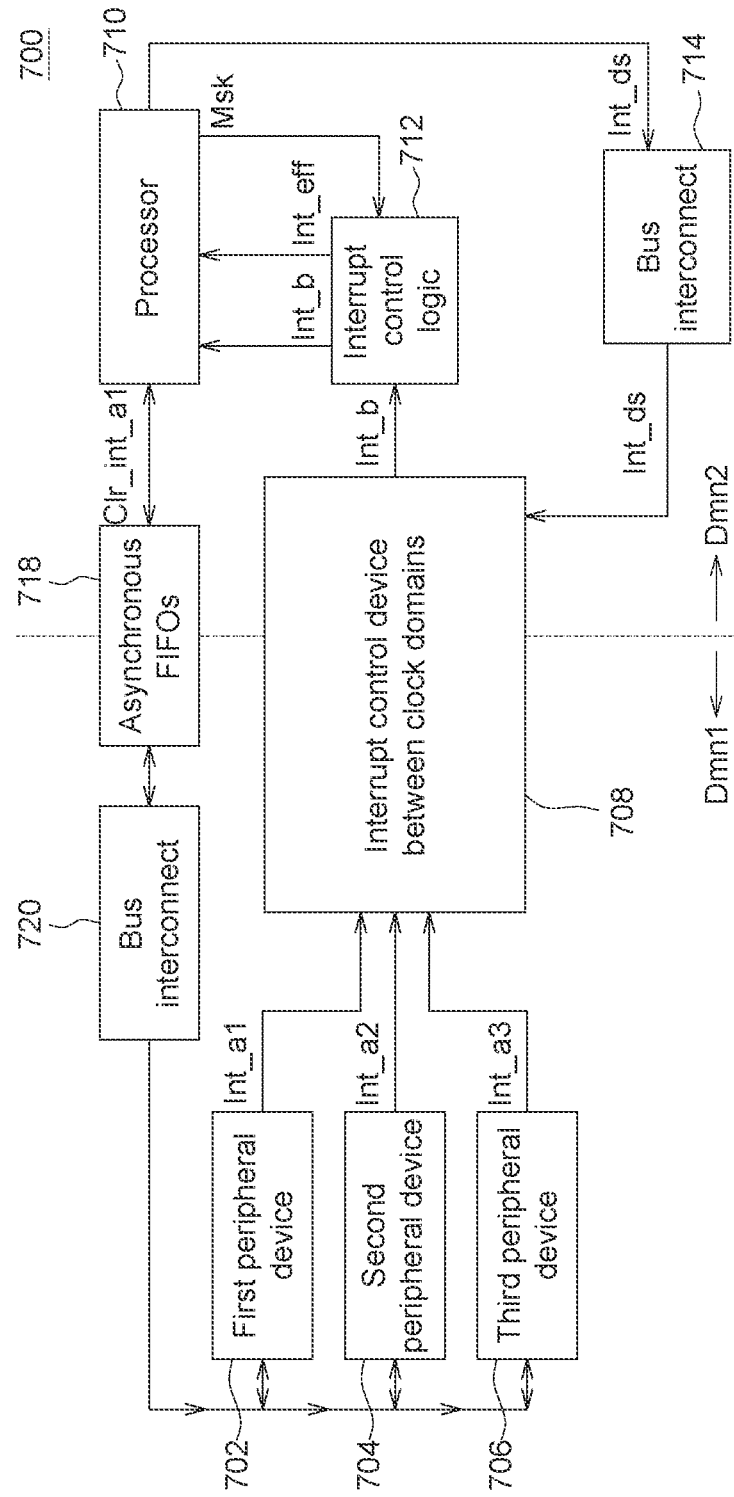
FIG. 7 is a block diagram of an interrupt signal processing system using an interrupt control device between clock domains according to an embodiment of the present disclosure.

To resolve the above problem of incorrect operation that the processor executes the interrupt service routine twice in response to an interrupt request due to the delay of interrupt clear signal caused by clock domain crossing, the present disclosure provides an interrupt control device between clock domains. Referring to FIG. 7, a block diagram of an interrupt signal processing system using an interrupt control device between clock domains according to an embodiment of the present disclosure is shown. In the interrupt signal processing system 700, a first original interrupt signal Int_a1, a second original interrupt signal Int_a2, and a third original interrupt signal Int_a3, respectively generated by a first peripheral device 702, a second peripheral device 704, and a third peripheral device 706, are inputted to an interrupt control device between clock domains 708 to generate a processed interrupt signal Int_b. The processed interrupt signal Int_b is inputted to the interrupt control logic 712 for the processor 710 to execute a corresponding interrupt service routine. The processor 710 sends instruction(s) and receives response(s) by way of the asynchronous FIFOs 718 and the bus interconnect 720 to and from the first peripheral device 702, the second peripheral device 704, or the third peripheral device 706. The processor 710 further outputs an interrupt disabled signal Int_ds to the interrupt control device between clock domains 708 via another bus interconnect 714.

Figure 8:
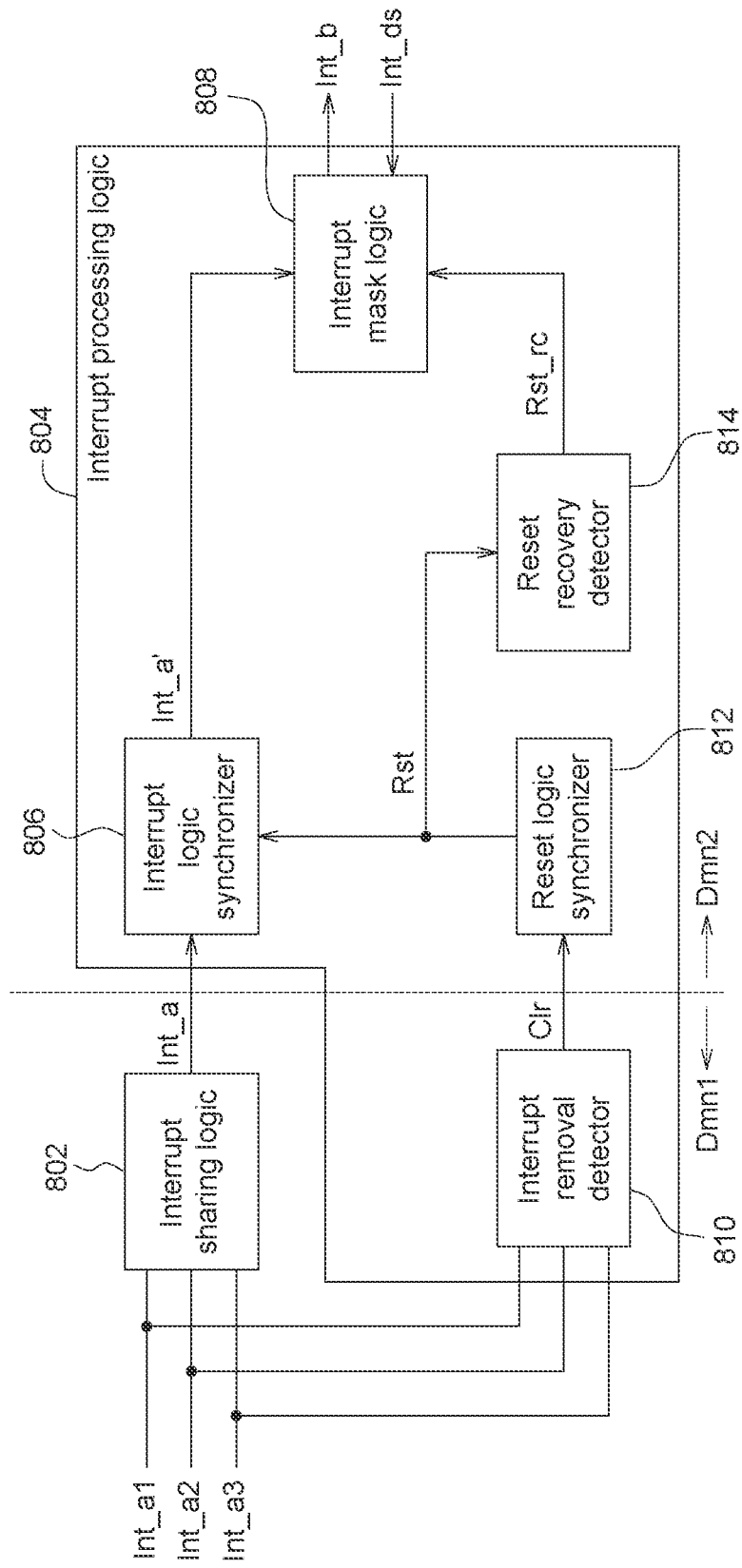
FIG. 8 is a block diagram of an interrupt control device between clock domains according to an embodiment of the present disclosure.

Referring to FIG. 8, a block diagram of an interrupt control device between clock domains according to an embodiment of the present disclosure is shown. The interrupt control device between clock domains 708 includes an interrupt sharing logic 802 and an interrupt processing logic 804, for example. The interrupt sharing logic 802 is configured to receive, for example, a first original interrupt signal Int_a1, a second original interrupt signal Int_a2 and a third original interrupt signal Int_a3 to generate a combined interrupt signal Int_a. The interrupt processing logic 804 is configured to output a processed interrupt signal Int_b through the interrupt control logic 712 to the processor 710 according to the combined interrupt signal Int_a, so that the processor 710 correspondingly executes an interrupt service routine according to the effective active interrupt signal Int_eff.

Before the interrupt service routine is completed, the processor 710 outputs an interrupt clear signal Clr_int_a1 to negate the first original interrupt signal Int_a1. After the interrupt processing logic 804 detects that the first original interrupt signal Int_a1 has been cleared properly, the interrupt processing logic 804 generates the processed interrupt signal Int_b according to the combined interrupt signal Int_a again.

Figure 9:
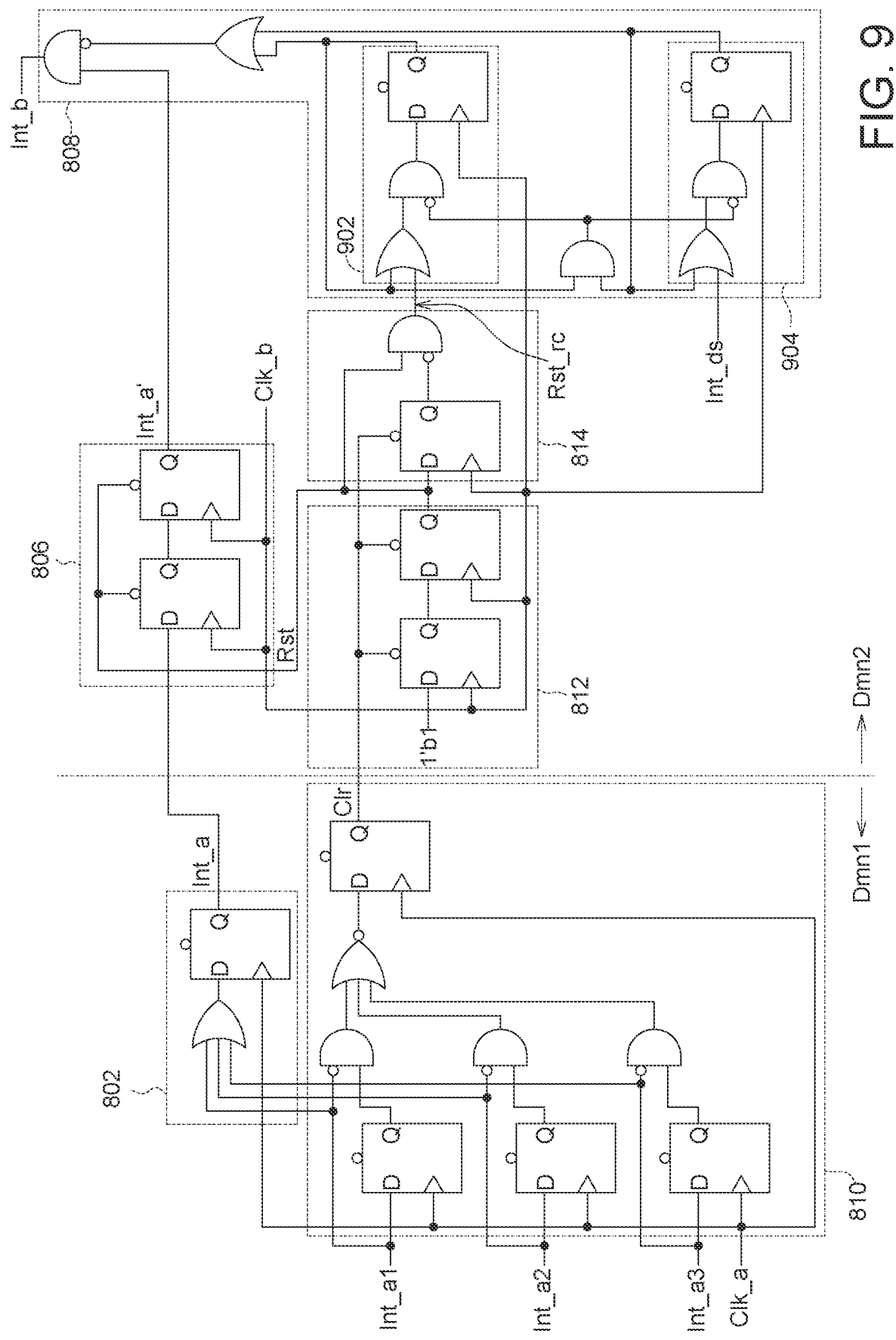
FIG. 9 an example of detailed circuit diagram of the interrupt control device between clock domains of FIG. 8.

Refer to both FIG. 8 and FIG. 9. FIG. 9 is an example of detailed circuit diagram of the interrupt control device between clock domains 708 of FIG. 8. The first peripheral device 702 and the second peripheral device 704 are located in the first clock domain Dmn1. The processor 710 is located in the second clock domain Dmn2. The interrupt sharing logic 802 is located in the first clock domain Dmn1. The interrupt processing logic 804 is located in both clock domains.

The interrupt processing logic 804 includes an interrupt logic synchronizer 806, for example. The first original interrupt signal Int_a1 and the second original interrupt signal Int_a2 is synchronized with a first clock signal Clk_a in the first clock domain Dmn1 to avoid glitches. The interrupt logic synchronizer 806 receives the combined interrupt signal Int_a and further synchronizes the combined interrupt signal Int_a with a second clock signal Clk_b in the second clock domain Dmn2 to output an adjusted interrupt signal Int_a'. The interrupt logic synchronizer 806 is further configured to receive a reset signal Rst. When the reset signal Rst is asserted (such as low level, logic 0), the adjusted interrupt signal Int_a' will be negated (such as low level, logic 0).

The interrupt processing logic 804, for example, further includes an interrupt removal detector 810 configured to output a clear indicator signal Clr. When the interrupt removal detector 810 detects that an original interrupt signal (for example, the first original interrupt signal Int_a1) is cleared (such as low level, logic 0), then the clear indicator signal Clr signal becomes asserted (such as low level, logic 0). The interrupt removal detector 810 and the interrupt sharing logic 802 are located in the same clock domain, such as the first clock domain Dmn1.

The interrupt processing logic 804, for example, further includes a reset logic synchronizer 812. When the clear indicator signal Clr signal is asserted (such as low level, logic 0), the reset logic synchronizer 812 changes the outputted reset signal Rst to be asserted (such as low level, logic 0). The reset signal Rst is outputted to an interrupt logic synchronizer 806.

The interrupt processing logic 804, for example, further includes a reset recovery detector 814 configured to receive the reset signal Rst. When the reset signal Rst changes to logic 1 from logic 0, the reset recovery detector 814 changes an outputted reset recovery signal Rst_rc to logic 1 from logic 0. The reset recovery detector 814 synchronizes the reset recovery signal Rst_rc with the second clock signal Clk_b in the second clock domain Dmn2.

The interrupt mask logic 808 of the interrupt processing logic 804 is further configured to receive the reset recovery signal Rst_rc and the interrupt disabled signal Int_ds. The interrupt mask logic 808 includes a first register 902 and a second register 904 to store values of the reset recovery signal Rst_rc and the interrupt disabled signal Int_ds respectively. Depends on the stored values, the interrupt mask logic 808 will generate the processed interrupt signal Int_b from the adjusted interrupt signal Int_a'. Detailed descriptions are disclosed below.

Figure 10:
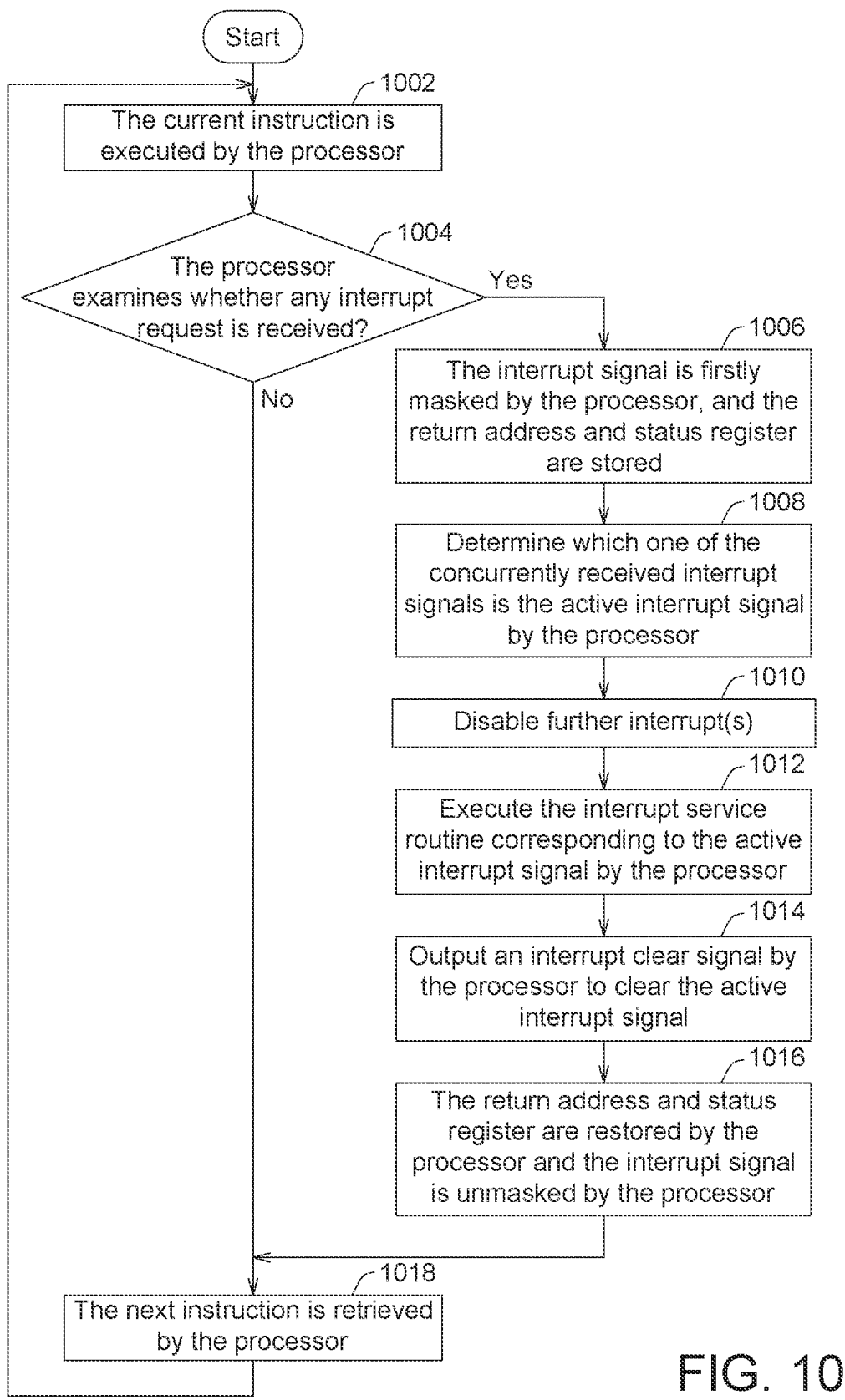
FIG. 10 is a flowchart of relevant operations performed by a processor in response to an interrupt signal outputted from an interrupt control device between clock domains.
Figure 11:
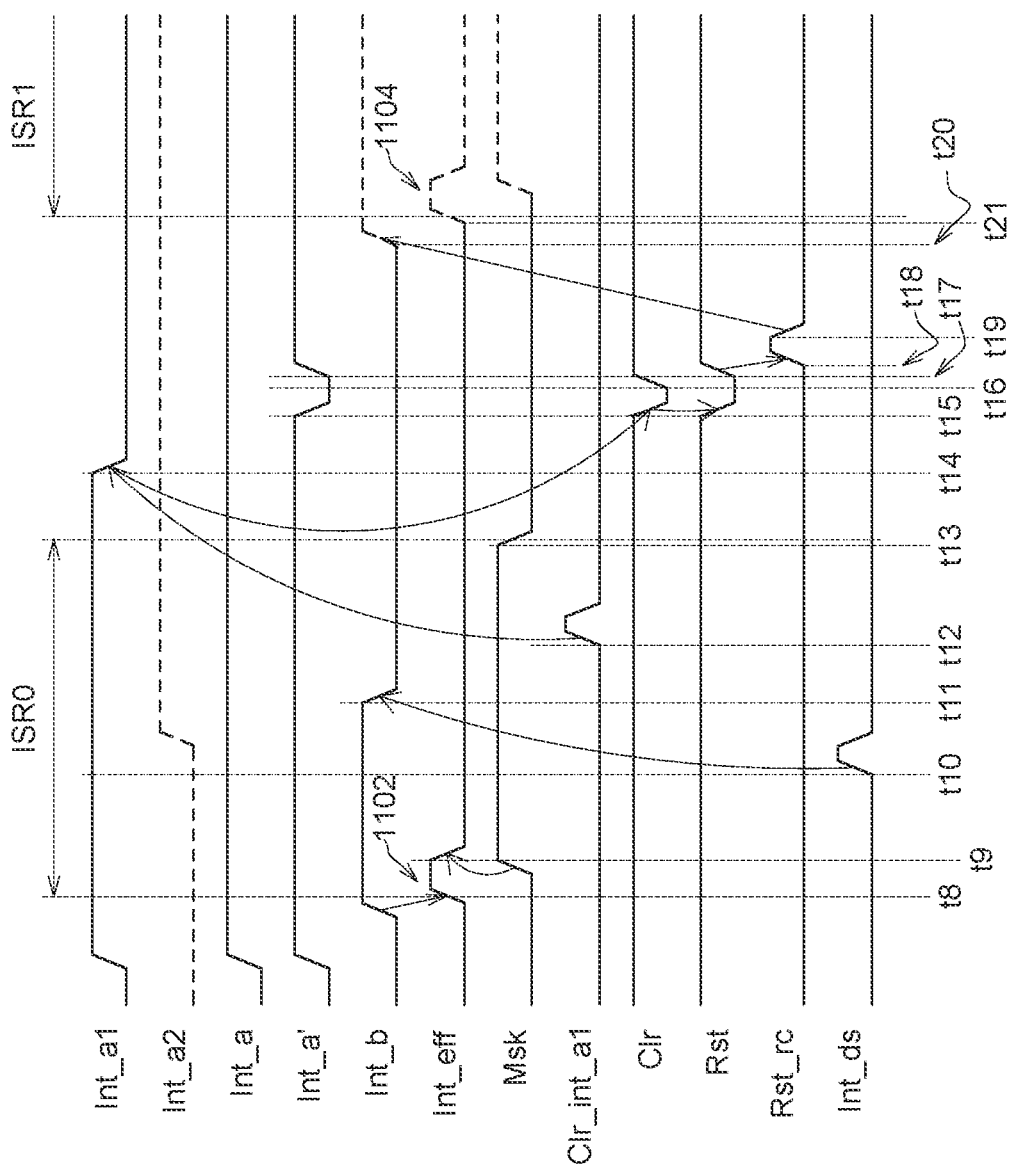
FIG. 11 is a waveform diagram of relevant signals generated when relevant operations are performed by the processor in response to an interrupt signal.

Referring to FIG. 10, a flowchart of relevant operations performed by a processor in response to an interrupt signal outputted from an interrupt control device between clock domains 708 is shown. Refer to FIG. 7, FIG. 8 and FIG. 11. FIG. 11 is a waveform diagram of relevant signals generated when relevant operations are performed by the processor in response to an interrupt signal. Firstly, the method begins at step 1002, and the current instruction is executed by the processor 710. Then, the method proceeds to step 1004, the processor 710 examines whether any interrupt request is received. If yes, the method proceeds to step 1006, otherwise the method proceeds to step 1018. For example, after the assertion of the processed interrupt signal Int_b (such as high level), the interrupt control logic 712 correspondingly changes the effective interrupt signal Int_eff to be asserted (such as high level) at time point t8. The processor 710 knows that the upcoming instruction is interrupted according to the assertion of the effective interrupt signal Int_eff.

In step 1006, the interrupt signal is firstly masked by the processor 710, and the return address and status register are stored. For example, after the effective active signal Int_eff becomes logic 1, the processor 710 changes the mask signal Msk to be enabled (such as high level) at time point t9, so that the interrupt control logic 712 accordingly changes the effective active signal Int_eff to be negated (such as low level) at time point t9.

Then, the method proceeds to step 1008, which one of the concurrently received interrupt signals is the active interrupt signal is determined by the processor 710. For example, the processor 710 uses the interrupt signal outputted from a peripheral device with a higher priority as the active interrupt signal. For example, the processor 710 use the first original interrupt signal Int_a1 outputted from the first peripheral device 702 as the active interrupt signal, wherein the first original interrupt signal Int_a1 has been included in the combined interrupt signal Int_a through the logic OR operation. The pulse 1102 of the effective active signal Int_eff is configured to instruct the processor 710 to execute the interrupt service routine corresponding to the active interrupt signal (such as the first original interrupt signal Int_a1).

Then, the method proceeds to step 1010, the interrupt disabled signal Int_ds is enabled (such as high level) by the processor 710 to disable further interrupt(s). For example, the interrupt disabled signal Int_ds changes to be enabled at time point t10, so that the processed interrupt signal Int_b changes to be negated (such as low level) at time point t11. Despite that the second original interrupt signal Int_a2 is still active (such as high level) and makes the combined interrupt signal Int_a remain asserted, the processed interrupt signal Int_b still remains negated.

Then, the method proceeds to step 1012, the interrupt service routine corresponding to the active interrupt signal is executed by the processor 710. For example, the corresponding interrupt service routine of the interrupt request corresponding to the pulse 1102 of the effective active signal Int_eff (such as the corresponding interrupt service routine of the interrupt request outputted from the first peripheral device 702) is executed, wherein the interrupt service routine is executed during period ISR0. Then, the method proceeds to step 1014, before the interrupt service routine is completed, the interrupt clear signal is outputted to the peripheral device corresponding to the active interrupt signal by the processor 710 to clear the active interrupt signal. For example, the processor 710 outputs the interrupt clear signal Clr_int_a1 to the first peripheral device 702 corresponding to the active interrupt signal at time point t12, so that the first peripheral device 702 negates the outputted first original interrupt signal Int_a1 (such as low level) at time point t14.

Then, the method proceeds to step 1016, the return address and status register are restored by the processor 710 and the interrupt signal is unmasked by the processor 710. For example, the processor 710 changes the mask signal Msk to be disabled (such as low level) at time point t13. Then, the method proceeds to step 1018, the next instruction is retrieved by the processor 710, and the method returns to step 1002. As shown in FIG. 11, when the mask signal Msk is disabled, it does not make the effective active interrupt Int_eff asserted immediately. The effective active interrupt Int_eff will be evaluate again until it sees that assertion of the reset recovery signal Rst_rc.

Figure 12:
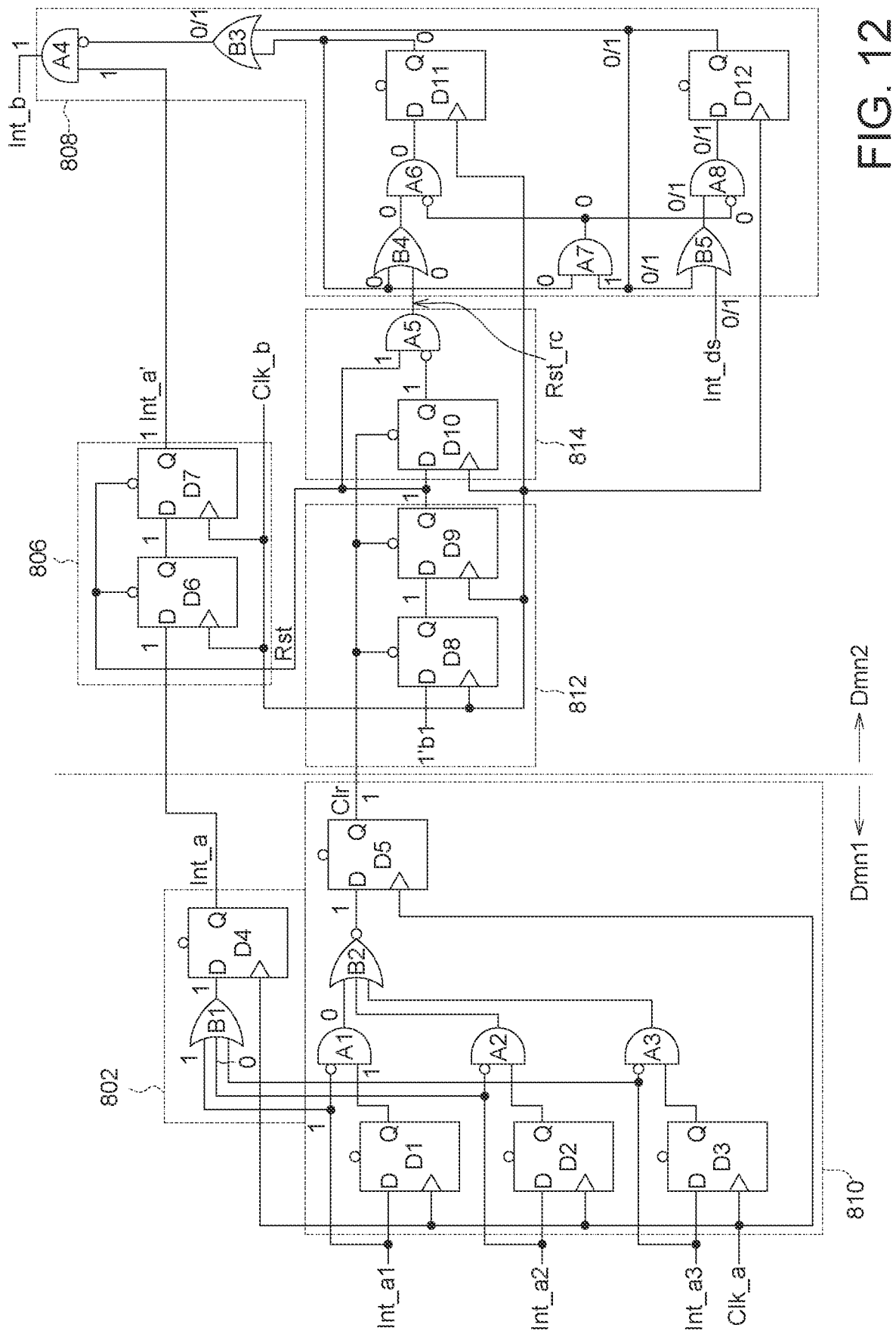
FIG. 12 is an example of logic state of the interrupt control device between clock domains of FIG. 9.

Refer to both FIG. 11 and FIG. 12. FIG. 12 is an example of logic state of the interrupt control device between clock domains 708 of FIG. 9. The interrupt control device between clock domains 708, for example, includes AND gates A1 to A8, OR gates B1 to B5, and flip-flops D1 to D12. As indicated in FIG. 12, the designation "0" represents logic 0, the designation "1" represents logic 1, and the designation "0/1" represents that the logic value is logic 0 at a previous time point and is logic 1 at another time point afterward.

Take time point t10 of FIG. 11 for example. In the interrupt sharing logic 802, a first original interrupt signal Int_a1 and a second original interrupt signal Int_a2 are combined to generate a combined interrupt signal Int_a by the OR gate B1 and the flip-flop D4. At this time, the first original interrupt signal Int_a1 is logic 1, the second original interrupt signal Int_a2 is logic 0, and the combined interrupt signal Int_a is logic 1.

In the interrupt logic synchronizer 806, the flip-flop D6 and the flip-flop D7 receives the combined interrupt signal Int_a and synchronizes the combined interrupt signal Int_a with a second clock signal Clk_b to output an adjusted interrupt signal Int_a'. At time point t10, for example, the adjusted interrupt signal Int_a' is logic 1.

In the interrupt mask logic 808, when the flip-flop D11 and the flip-flop D12 output logic 0, the OR gate B3 outputs logic 0, so that the adjusted interrupt signal Int_a' can pass the AND gate A4 and be used as the processed interrupt signal Int_b.

Figure 13:
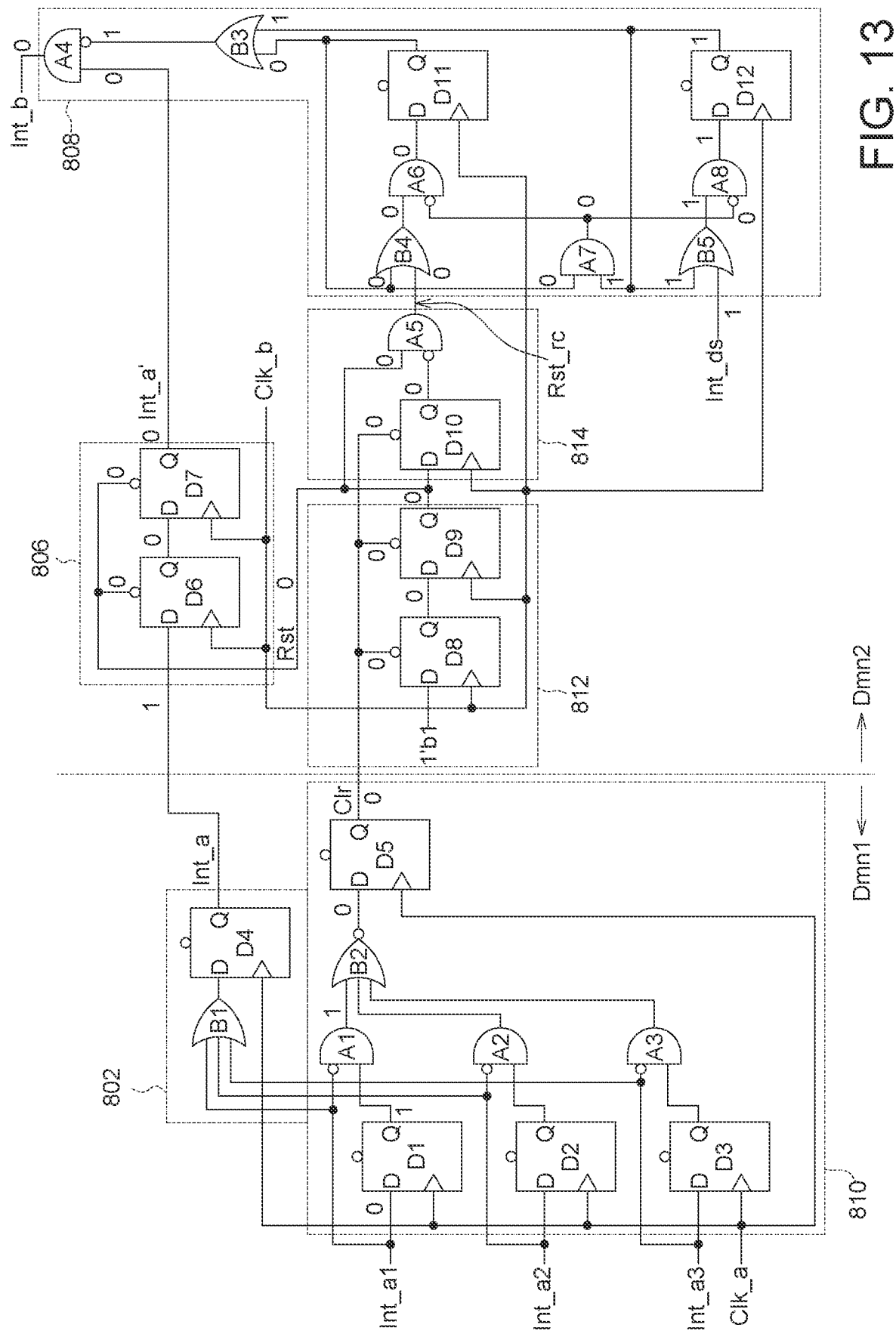
FIG. 13 is another example of logic state of the interrupt control device between clock domains of FIG. 9.

Refer to both FIG. 11 and FIG. 13. FIG. 13 is another example of logic state of the interrupt control device between 708 of FIG. 9. In FIG. 13, the designation "0" represents logic 0, and the designation "1" represents logic 1.

In the interrupt removal detector 810, when the first original interrupt signal Int_a1 changes to be disabled (such as low level, logic 0) from being enabled (such as high level, logic 1) at time point t14, the value outputted by the flip-flop D1 is the value of the first original interrupt signal Int_a1 at a previous time point, that is, logic 1. Thus, the AND gate A1 outputs logic 1, such that the OR gate B2 outputs logic 0, and the clear indicator signal Clr outputted by the flip-flop D5 at time point t15 changes to logic 0 (enabled) from logic 1 (disabled). That is, after the interrupt removal detector 810 detects that the first original interrupt signal Int_a1 has changed to be disabled (logic 0), the clear indicator signal Clr changes to be asserted (logic 0).

In the reset logic synchronizer 812, at time point t15, when the clear indicator signal Clr changes to be asserted (logic 0), since the clear indicator signal Clr is inputted to the reset pins of the flip-flop D8, the flip-flop D9, and the flip-flop D10, the clear indicator signal Clr whose value is logic 0 will make the output of the flip-flop D8, the flip-flop D9, and the flip-flop D10 become logic 0, and the outputted reset signal Rst changes to be asserted (logic 0).

In the reset recovery detector 814, the assertion of the reset signal Rst (logic 0) makes the reset recovery signal Rst_rc outputted from the AND gate A5 remain disabled (logic 0).

Figure 14:
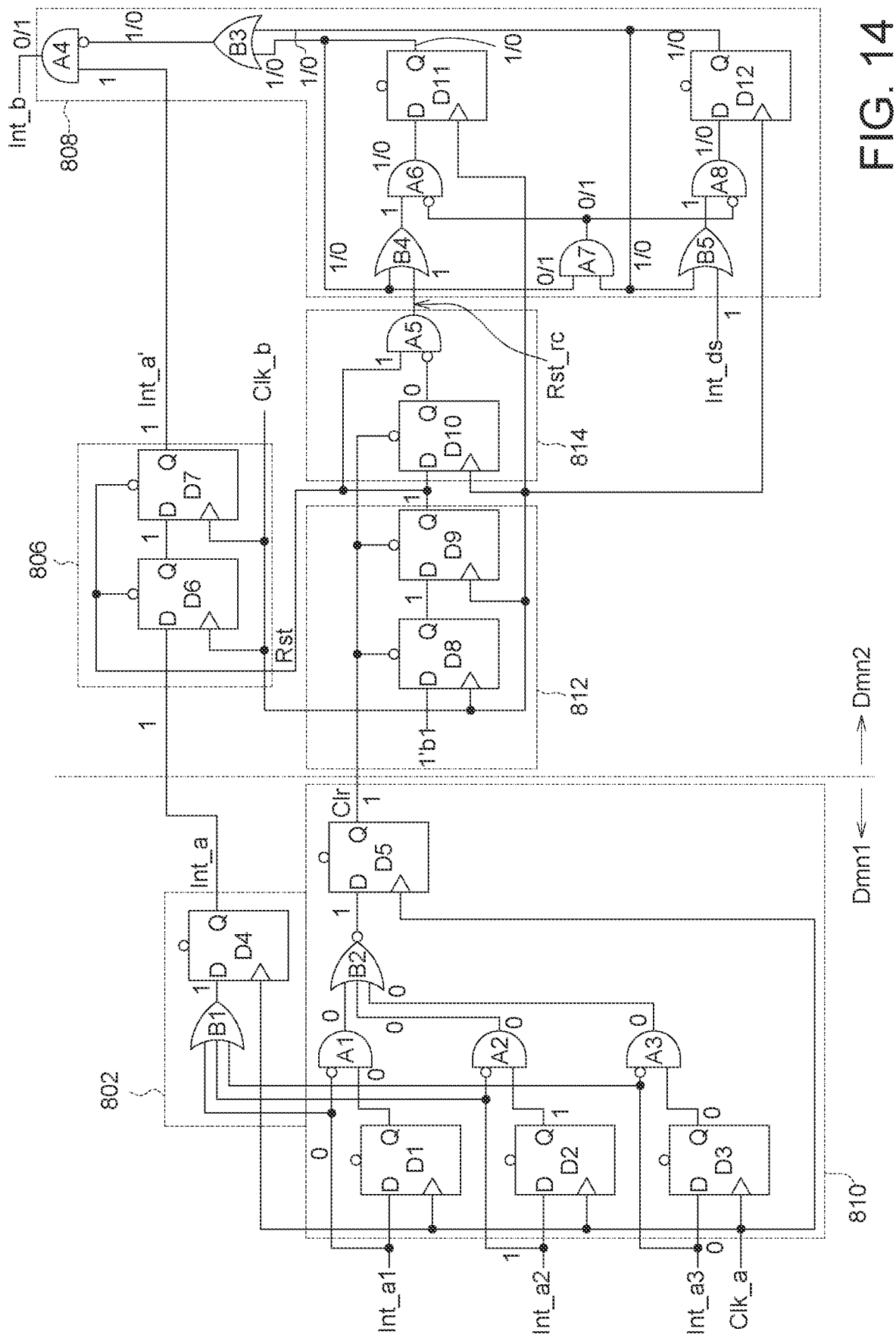
FIG. 14 is an alternate example of logic state of the interrupt control device between clock domains of FIG. 9.

Refer to both FIG. 11 and FIG. 14. FIG. 14 is an alternate example of logic state of the interrupt control device between clock domains 708 of FIG. 9. In FIG. 14, the designation "0" represents logic 0, the designation "1" represents logic 1, the designation "1/0" represents that the logic value is logic 1 at a previous time point and is logic 0 at another time point afterward, and the designation "0/1" represents that the logic value is logic 0 at a previous time point and is logic 1 at another time point afterward.

For example, at time point t16, the clear indicator signal Clr changes to be disabled (logic 1). After the clear indicator signal Clr whose value is logic 1 is inputted to the reset pins of the flip-flop D8, the flip-flop D9, and the flip-flop D10, the flip-flop D8, the flip-flop D9, the flip-flop D10 will not be reset, so that the value of logic 1 will propagate to the outputs of the flip-flop D8, the flip-flop D9, and the flip-flop D10, and consequently the value of the reset signal Rst changes to logic 1 (such as time point t17). Since the inverting input of the AND gate A5 receives the previous value (logic 0) of the reset signal Rst outputted from the flip-flop D10, and the other input of the AND gate A5 receives logic 1 of the reset signal Rst at the current time point, the AND gate A5 outputs logic 1. That is, at this time, the reset recovery signal Rst_rc changes to logic 1 (such as at time point t18). The value of logic 1 of the reset recovery signal Rst_rc, passing through the loop formed by the OR gate B4, the AND gate A6, and the flip-flop D11, makes the output of the flip-flop D11 remain the value of logic 1. The OR gate B4, the AND gate A6, and the flip-flop D11 are used as the first register 902. Even when the value of the reset recovery signal Rst_rc changes to logic 0 at time point t19, the value of logic 1 that the reset recovery signal Rst_rc previously had will also be stores in the first register 902 (that is, the flip-flop D11 continues to output the value of logic 1 through the loop formed by the OR gate B4, the AND gate A6, and the flip-flop D11).

When the interrupt disabled signal Int_ds changes to be enabled (logic 1) at time point t10, the value of logic 1 of the interrupt disabled signal Int_ds makes the output of the flip-flop D12 remain at the value of logic 1 of the interrupt disabled signal Int_ds through the loop formed by the OR gate B5, the AND gate A8, and the flip-flop D12. The OR gate B5, the AND gate A8, and the flip-flop D12 are used as the second register 904.

Therefore, when the reset recovery signal Rst_rc changes to be enabled (logic 1), the first register 902 stores a first logic value (logic 1). When the interrupt disabled signal Int_ds changes to be enabled (logic 1), the second register 904 stores a second logic value (logic 1). When the first register 902 stores the first logic value (logic 1) and the second register 904 stores the second logic value (logic 1), both two inputs of the AND gate A7 have the value of logic 1, and the AND gate A7 outputs logic 1, so that the outputs of the AND gates A6 and A8 change to logic 0, and consequently makes the outputs of the flip-flops D11 and D12 change to logic 0. Meanwhile, the output of the OR gate B3 changes to logic 0, so that the adjusted interrupt signal Int_a' can pass through the AND gate A4 and be used as the processed interrupt signal Int_b. The situation that the adjusted interrupt signal Int_a' passes through the AND gate A4 and is used as the processed interrupt signal Int_b means that the logic value of the processed interrupt signal Int_b will be equivalent to the logic value of the adjusted interrupt signal Int_a', and the interrupt mask logic 808 uses the adjusted interrupt signal Int_a' as the processed interrupt signal Int_b.

Therefore, as indicated in FIG. 11, after the interrupt processing logic 804 changes the clear indicator signal Clr to be asserted (logic 0) at time point t15, the reset signal Rst changes to be enabled (logic 0), the reset recovery signal Rst_rc whose value is logic 1 is generated later and the first original interrupt signal Int_a1 is detected to have changed to be cleared, the interrupt processing logic 804 changes the disabled processed interrupt signal Int_b (the value is logic 0) to correspond to the combined interrupt signal Int_a. As indicated at time point t20 of FIG. 11, the interrupt processing logic 804 again generates the processed interrupt signal Int_b. For example, the processed interrupt signal Int_b which is originally negated (logic 0) is changed by using the adjusted interrupt signal Int_a' (generated based on the combined interrupt signal Int_a) as the processed interrupt signal Int_b.

In response to the pulse 1102 of the effective interrupt signal Int_eff of the first original interrupt signal Int_a1, the processor 710 executes the interrupt service routine (corresponding to the interrupt request signal corresponding to the first original interrupt signal Int_a1 from the first peripheral device 702) during period ISR0. After the processed interrupt signal Int_b changes to be enabled at time point t20 by sampling the adjusted interrupt signal Int_a' again, the above operations are repeated and the effective interrupt signal Int_eff generates another pulse 1104 at time point t21. The processor 710 executes another interrupt service routine (corresponding to the interrupt request signal corresponding to the second original interrupt signal Int_a2 from the second peripheral device 704) during period ISR1.

The present disclosure further provides an interrupt control method between clock domains. The method includes the following steps. One or more original interrupt signals are combined as a combined interrupt signal. A processed interrupt signal is generated according to the combined interrupt signal, so that a processor executes an interrupt service routine. When the interrupt service routine is executed, the processor will send a control signal to block further interrupt(s). Before the interrupt service routine is completed, the processor outputs an interrupt clear signal to the respective interrupt device. Then the interrupt processing logic detects the previous interrupt signal has been cleared properly and the processed interrupt signal will be generated according to the combined interrupt signal again.

The interrupt signals are generated by peripheral devices in the first clock domain, the processor is located in the second clock domain, the combined interrupt signal is located in the first clock domain, and the processed interrupt signal is located in the second clock domain. The combined interrupt signal corresponds to the result of logic OR operation for one or more interrupt signals.

The original interrupt signals are synchronized with a first clock signal in the first clock domain. The interrupt control method between clock domains further includes the following steps. The combined interrupt signal is synchronized with a second clock signal in the second clock domain to obtain an adjusted interrupt signal. When a derived reset signal is asserted, the adjusted interrupt signal changes to be negated.

The interrupt control method between clock domains further includes the following steps. A reset recovery signal will be generated according to a derived reset signal.

The interrupt control method between clock domains further includes the following steps. When the reset recovery signal is asserted, the adjusted interrupt signal is going to be re-evaluated.

The interrupt control method between clock domains further includes the following steps. After it is detected that the respective interrupt signal has been cleared, a clear indicator signal changes to be asserted. The interrupt signal and the clear indicator signal are located in the same clock domain.

The interrupt control method between clock domains further includes the following step. When the clear indicator signal changes to be asserted, a derived reset signal changes to be asserted.

The interrupt control method between clock domains further includes the following steps. When the derived reset signal changes to be negated from being asserted, a reset recovery signal which is outputted changes to be asserted from being negated, and the reset recovery signal is synchronized with a second clock signal in the second clock domain.

The interrupt control method between clock domains further includes the following steps. When the reset recovery signal changes to be enabled, a first register stores a first logic value. When an interrupt disabled signal changes to be enabled, a second register stores a second logic value. When both logic values are asserted, then the adjusted interrupt signal will be re-evaluated later.

According to the interrupt control device between clock domains and the interrupt control method of the present disclosure, when the interrupt service is executed, the processor will send a control signal to block further interrupt(s). Before the interrupt service routine is completed, the processor outputs an interrupt clear signal to the respective interrupt device. After the respective interrupt signal is detected to have been cleared in response to the interrupt clear signal, the combined interrupt signal is generated again to determine whether other interrupt request(s) exist. Thus, the incorrect operation of repeatedly executing the interrupt service routine by the processor in response to the interrupt signal can be effectively avoided, the failure of the processor can be prevented and system stability can be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An interrupt control device between clock domains, comprising:
   an interrupt sharing logic, configured to receive one or more original interrupt signals and generate a combined interrupt signal; and
   an interrupt processing logic, configured to output a processed interrupt signal to a processor according to the combined interrupt signal, so that the processor correspondingly executes an interrupt service routine;
   wherein when the interrupt service routine is executed, the processor sends a control signal to block further interrupt(s) and then the processor outputs an interrupt clear signal to change a respective interrupt signal to be negated among the one or more original interrupt signals, and after the interrupt processing logic detects the clearance of the respective interrupt signal, the interrupt processing logic generates the processed interrupt signal according to the combined interrupt signal again;

wherein the original interrupt signals are generated by peripheral devices in a first clock domain, the processor is located in a second clock domain, the interrupt sharing logic is located in the first clock domain, and the interrupt processing logic is located in both of the first and second clock domains.

2. The interrupt control device according to claim 1, wherein the combined interrupt signal corresponds to a result of logic OR operation executed by the one or more original interrupt signals.

3. The interrupt control device according to claim 1, wherein the interrupt processing logic comprises an interrupt logic synchronizer, the one or more original interrupt signals are synchronized with a first clock signal in the first clock domain, the interrupt logic synchronizer receives the combined interrupt signal and synchronizes the combined interrupt signal with a second clock signal in the second clock domain to output an adjusted interrupt signal, the interrupt logic synchronizer is further configured to receive a reset signal, and when the reset signal is asserted, the adjusted interrupt signal changes to be negated.

4. The interrupt control device according to claim 3, wherein the interrupt processing logic further comprises a reset recovery detector configured to receive a derived reset signal and output a reset recovery signal, and when the derived reset signal is negated, the reset recovery signal is asserted.

5. The interrupt control device according to claim 4, wherein the interrupt processing logic further comprises an interrupt mask logic configured to output the processed interrupt signal with the relationship of the adjusted interrupt signal, the interrupt disabled signal, and the reset recovery signal.

6. The interrupt control device according to claim 1, wherein the interrupt processing logic further comprises an interrupt removal detector configured to output a clear indicator signal, and after the interrupt removal detector detects that the respective interrupt signal has been cleared, the clear indicator signal changes to be asserted, and the interrupt removal detector and the interrupt sharing logic are located in the same clock domain.

7. The interrupt control device according to claim 6, wherein the interrupt processing logic further comprises a reset logic synchronizer and an interrupt logic synchronizer, the reset logic synchronizer is configured to output a reset signal to the interrupt logic synchronizer when the clear indicator signal changes to be asserted.

8. The interrupt control device according to claim 7, wherein the interrupt processing logic further comprises a reset recovery detector configured to receive the reset signal, and the reset recovery detector is further configure to change a reset recovery signal outputted from the reset recovery detector to be asserted from being negated and synchronize the reset recovery signal with a second clock signal in the second clock domain when the reset signal changes to be negated from being asserted.

9. The interrupt control device according to claim 8, wherein the interrupt processing logic further comprises an interrupt mask logic configured to receive an interrupt disabled signal, the reset recovery signal, and an adjusted interrupt signal, the interrupt mask logic comprises a first register and a second register, when the reset recovery signal changes to be enabled, the first register stores a first logic value, when the interrupt disabled signal changes to be enabled, the second register stores a second logic value, when the first register stores the first logic value and the second register stores the second logic value, the interrupt mask logic uses the adjusted interrupt signal to output the processed interrupt signal.

10. An interrupt control method between clock domains, comprising:
combining one or more original interrupt signals as a combined interrupt signal; and
generating a processed interrupt signal according to the combined interrupt signal, so that a processor executes an interrupt service routine, wherein when the interrupt service routine is executed, the processed interrupt signal changes to be disabled;
wherein before the interrupt service routine is completed, the processor outputs an interrupt clear signal to instruct changing a respective interrupt signal to be negated among the one or more original interrupt signals, and after the clearance of the respective interrupt signal is detected, the processed interrupt signal is generated according to the combined interrupt signal again;
wherein the original interrupt signals are generated by peripheral devices in a first clock domain, the processor is located in a second clock domain, the combined interrupt signal is located in the first clock domain, and the processed interrupt signal is located in the second clock domain.

11. The interrupt control method according to claim 10, wherein the combined interrupt signal corresponds to a result of logic OR operation for the one or more original interrupt signals.

12. The interrupt control method according to claim 10, wherein the one or more original interrupt signals are synchronized with a first clock signal in the first clock domain, the method further comprises:
synchronizing the combined interrupt signal with a second clock signal in the second clock domain to obtain an adjusted interrupt signal, wherein when a derived reset signal is asserted, the adjusted interrupt signal changes to be negated.

13. The interrupt control method according to claim 12, further comprising:
generating a reset recovery signal according to the derived reset signal, wherein when the derived reset signal is changed to be negated, the reset recovery signal is asserted.

14. The interrupt control method according to claim 13, further comprising:
when the reset recovery signal is asserted, the adjusted interrupt signal is re-evaluated to output the processed interrupt signal.

15. The interrupt control method according to claim 14, further comprising:
after it is detected the clearance of the respective interrupt signal, then a clear indicator signal is asserted, wherein the respective interrupt signal and the clear indicator signal are located in the same clock domain.

16. The interrupt control method according to claim 15, further comprising:
when the clear indicator signal changes to be asserted, changing the derived reset signal to be asserted.

17. The interrupt control method according to claim 16, further comprising:
when the reset signal changes to be negated from being asserted, changing a reset recovery signal to be asserted from being negated and synchronizing the reset recovery signal with a second clock signal in the second clock domain.

18. The interrupt control method according to claim 17, further comprising:

when the reset recovery signal changes to be enabled, storing a first logic value to a first register; and when an interrupt disabled signal changes to be enabled, storing a second logic value to a second register; and when the first register stores the first logic value and the second register stores the second logic value, using the adjusted interrupt signal as the processed interrupt signal.

\* \* \* \* \*